July 26, 1949.　　　　　E. H. WENBERG　　　　　2,477,027
STAR RECOGNITION TRAINER
Filed June 7, 1945　　　　　　　　　　　　　　3 Sheets-Sheet 1

Inventor
EDWIN H. WENBERG
By Ralph L. Chappell
Attorney

July 26, 1949. E. H. WENBERG 2,477,027
STAR RECOGNITION TRAINER

Filed June 7, 1945 3 Sheets-Sheet 2

Inventor
EDWIN H. WENBERG
By Ralph L. Chappell
Attorney

July 26, 1949.                 E. H. WENBERG                 2,477,027
                          STAR RECOGNITION TRAINER
Filed June 7, 1945                                         3 Sheets-Sheet 3

Inventor
EDWIN H. WENBERG
By Ralph L. Chappell
    Attorney

Patented July 26, 1949

2,477,027

UNITED STATES PATENT OFFICE 2,477,027

STAR RECOGNITION TRAINER

Edwin H. Wenberg, United States Navy

Application June 7, 1945, Serial No. 598,179

7 Claims. (Cl. 35—43)

(Granted under the act of March 3, 1883, as amended April 30, 1928; 370 O. G. 757)

This invention relates to training or educational devices for the purpose of illustrating the disposition of stars and constellations, etc., in the sky.

Devices of this kind have been well known in the past but my apparatus has several advantages over such prior devices. Among the advantages are simplicity of construction, portability and the fact that the apparatus can be adjusted to show the disposition of the stars in the heavens when viewed from any part of the surface of the earth and at any time.

Basically, my device comprises a foldable umbrella-type canopy which can be suspended in any desired manner, and onto the interior surface of which are projected images of the stars. The projector comprises a hollow opaque globe which is mounted on a portable folding stand so that it can rotate about two intersecting axes at right angles to each other. The globe is perforated so that a light on the interior thereof will shine through the perforations onto the interior surface of the canopy, the pattern of the perforations and their sizes being such that the images projected onto the canopy will be properly disposed with reference to each other and of proper respective sizes. The portable stand on which the globe is supported is adjustable so that the globe can have its center positioned substantially at the center of curvature of the canopy. A hand held spotlight receives electrical energy from the same supply that services the light within the globe, and is used by the instructor to throw a moving spot of light upon the canopy while pointing out and naming various stars.

It is accordingly the object of my invention to provide an improved device for the illustration of stars and constellations, etc., in the sky, which device is easily portable, simple in construction, and adjustable to show the disposition of the stars in the heavens when viewed from any part of the surface of the earth at any time.

Other objects will become apparent as the description proceeds in connection with the accompanying drawings wherein.

Figure 1:
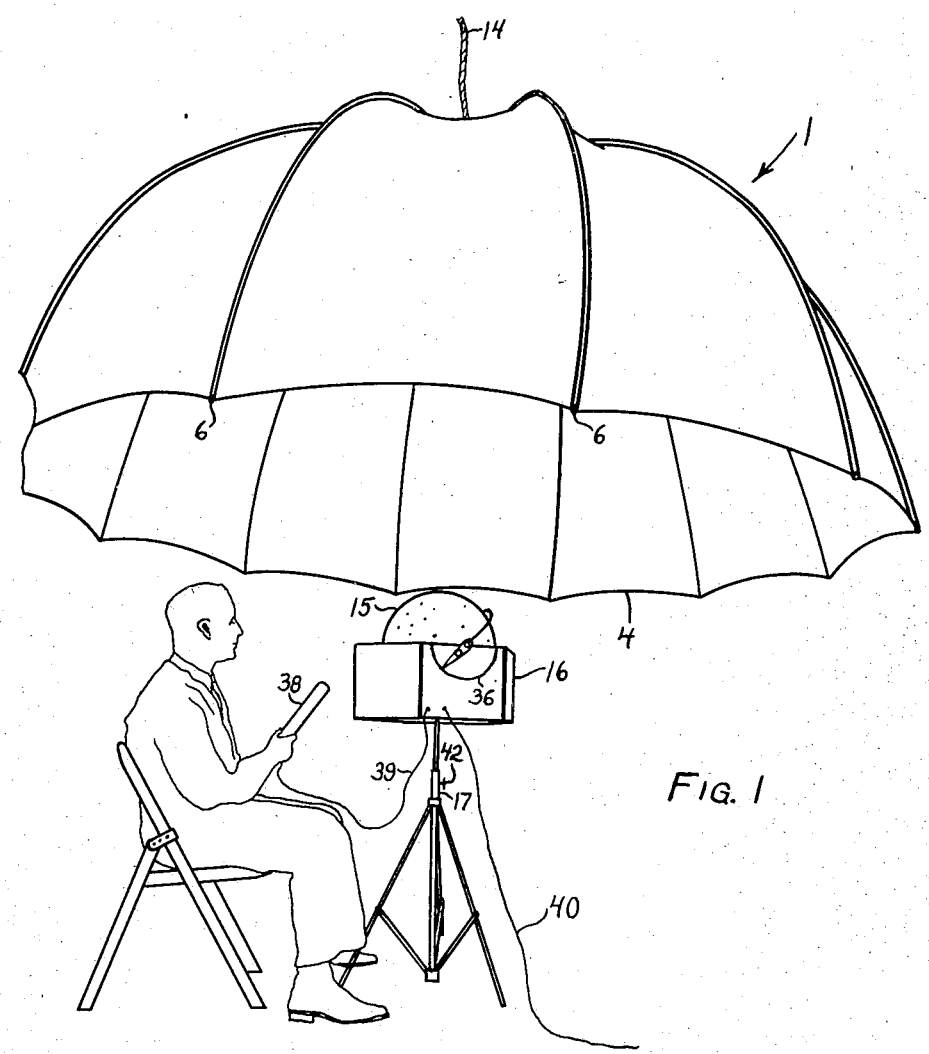
Fig. 1 is a perspective view of the entire apparatus.

As shown in Fig. 1, a canopy generally designated at 1 is suspended in any suitable manner from an overhead structure, as by a rope 14 extending from the center of the top of the canopy to a hook or the like in a ceiling above. The canopy has the general appearance of an umbrella except that in cross-section it is substantially spherical in shape and there are no internal braces or stays. A metallic frame having a top central flat circular plate 2 (Fig. 4) and a number of equiangularly spaced ribs 3 which are pivotally attached at their upper end to the plate, is the support for a fabric cover 4 which is stretched between the ribs to form the canopy. The ribs 3 are substantially circular arcs so that when the cover 4 is applied to them, it will assume a shape which is as nearly spherical as possible.

Figure 5:
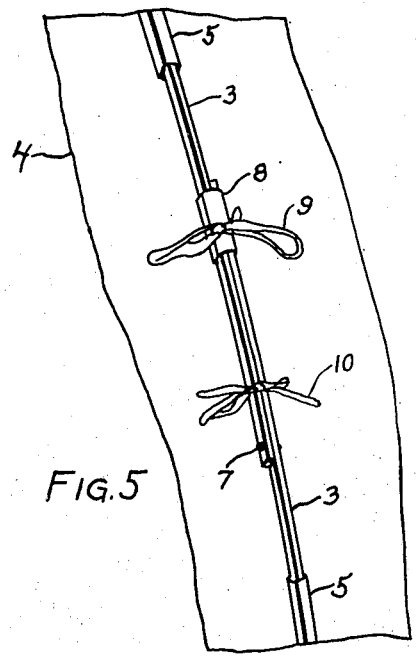
Fig. 5 is a perspective view of a portion of the canopy, showing one of the ribs as it appears when the canopy is erected.
Figure 6:
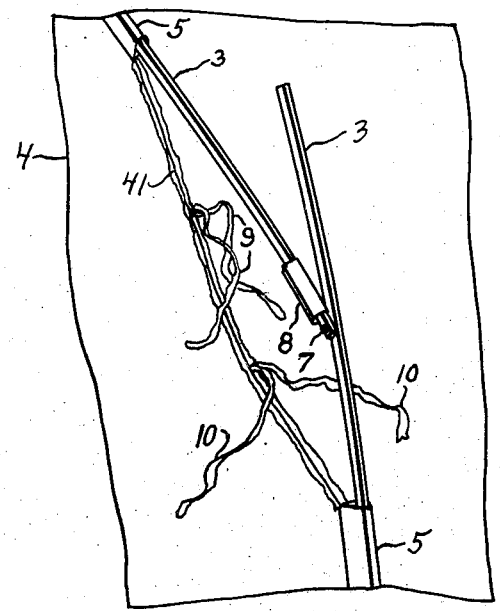
Fig. 6 is a view similar to Fig. 5, but showing the rib unlocked so that the canopy can be folded.

In order that the interior of the canopy be unobstructed, the cover 4 is provided with external loops 5 extending the length of the ribs, except for the discontinuities shown in Figs. 5 and 6 which are near the center of the length of the ribs 3. The ribs pass through the loops 5 and thus stretch the cover 4 into the required shape, the loops being closed at the lower ends 6 of the ribs, so that the cover 4 cannot slide upwardly along the ribs when it is stretched as shown in Fig. 1. Preferably, the length of the ribs are such that the canopy forms a surface which is not as large as a hemisphere; for example, the arcuate measurement from the lower ends 6 of the ribs to the center of the plate 2 will be about 70 degrees. The cover 4 is formed of a number of segments joined by seams 41 along the loops 5, as is apparent from Fig. 6.

The discontinuities in the loops 5 shown in Figs. 5 and 6 are for the purpose of folding the canopy for storage or shipment, etc. Each rib 3 is not continuous from the circular plate 2 to the lower ends 6, but is formed of two pieces of substantially equal length which overlap as shown in Fig. 5, thus forming upper and lower sections. A pin 7 passes through the bottom end portion of each upper section and through the lower section at that point so that they are hinged together. The upper end of the lower section thus overlaps a substantial length of the lower end of the upper section, above the pin 7 as clearly shown in Fig. 5. A tubular slide lock 8 has internal dimensions such as to snugly embrace the overlapping portions of the upper and lower sections of the rib above the pin 7, and will thus hold the sections in the position shown in Fig. 5 to extend the canopy to its designed form. Since the loops 5 do not extend around the ribs at this hinged point, a pair or more of tie strings 9, 10, which are fastened to the exterior of the cover along the seam 41, are used to pull the cover up to the rib 3 and tie it there as shown in Fig. 5.

Figure 4:
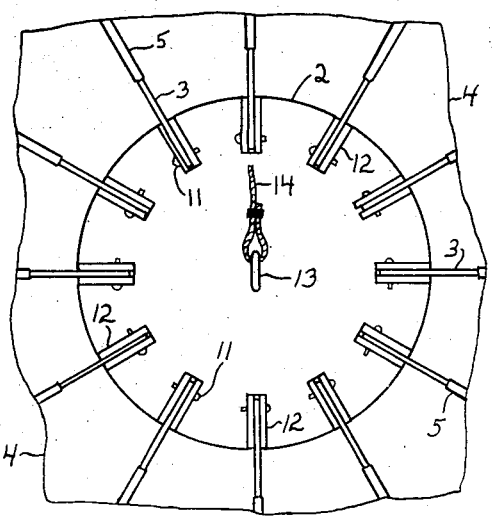
Fig. 4 is a top plan view of the center of the canopy.

Fig. 6 shows how the cover will pull away from the ribs when the tie strings are not tied. The same figure shows how the upper and lower sections of the ribs can be folded up around the pins 7 so that the canopy can be stored. When the tubular slide block 8 is pushed upward beyond the upper end of the lower section of the rib 3 it allows the two sections to fold against each other, with the material of the cover 4 between them. The upper ends of the upper sections of the ribs 3 are hingedly connected to the circular plate 2 by means of pins 11 (Fig. 4) which pass through the upper ends of the ribs and through brackets 12 which are radially arranged adjacent the periphery of the circular plate 2 and which are substantially U-shaped in cross-section. Fig. 4 also shows an eyelet 13 fastened to the center of plate 2 through which the rope 14 may be passed for hanging the canopy from a suitable overhead structure.

An opaque globe 15 is mounted within an open-topped box 16 which is in turn supported upon a suitable stand 17. The stand 17 is vertically adjustable by means of clamping screw 42 so that the globe 15 can be positioned with its center substantially at the same point as the center of the spherical canopy 1. The canopy may be raised or lowered with respect to its overhead support to accomplish the same purpose by adjusting the length of rope 14.

Figure 2:
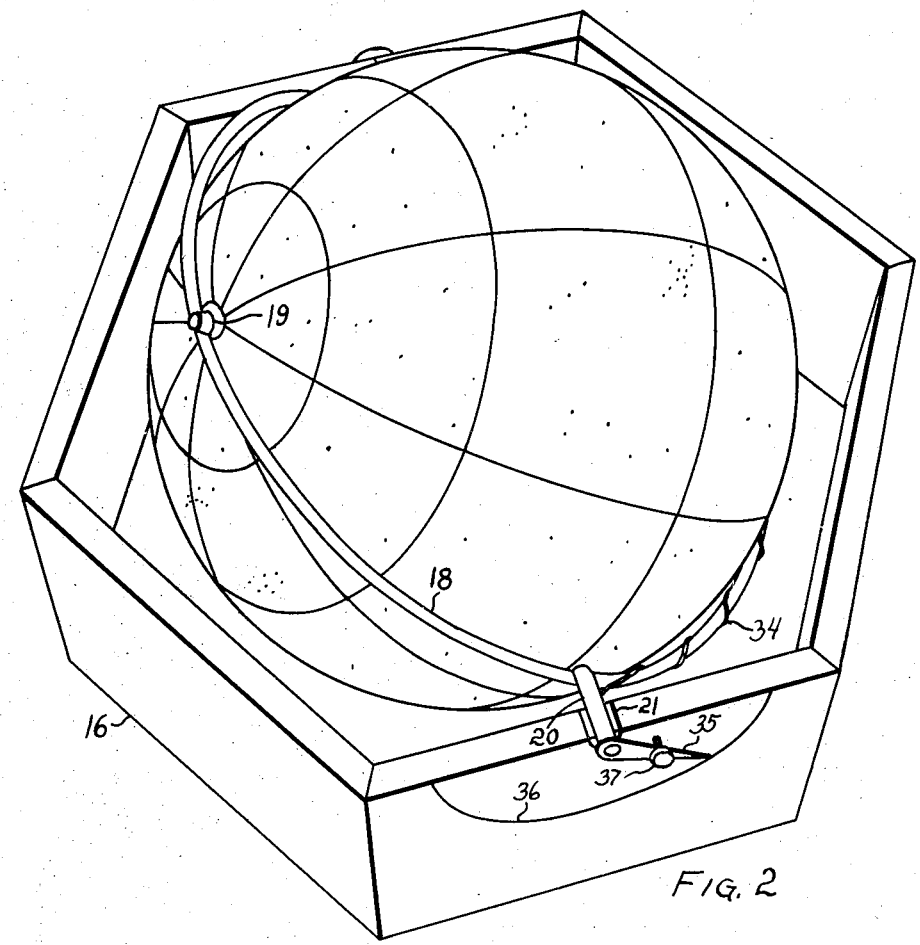
Fig. 2 is a perspective view of the globe and the box within which it is supported.

The globe is mounted for rotation within a gimbal ring 18 and about a polar axis one end of which is indicated by the pivot 19 in Fig. 2. The gimbal ring is in turn mounted for rotation about a horizontal second axis which intersects the polar axis at right angles at the center of the globe. Two diametrically opposite pivots, one of which is shown at 20 in Fig. 2 are attached to the gimbal ring and are supported for rotation in bearings 21 adjacent the upper edge of and on opposite sides of the box 16. In this manner approximately half of the globe lies within the box and the other half is exposed above the walls thereof.

Figure 3:
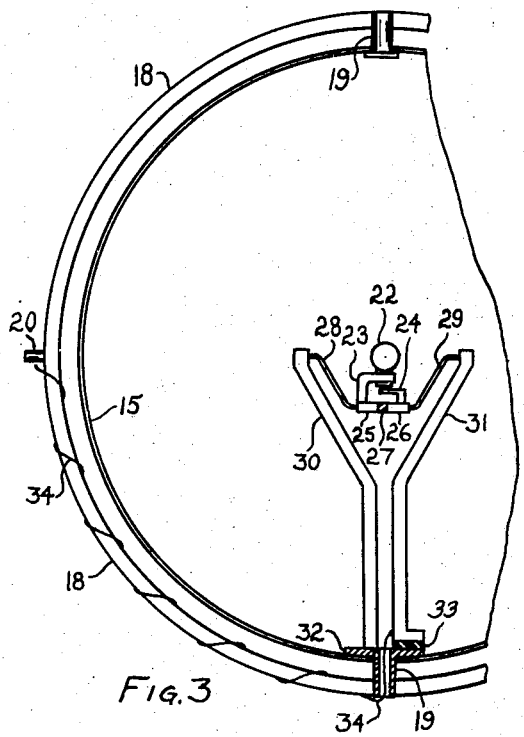
Fig. 3 is a sectional view through a portion of the globe showing how the light is supported.

Fig. 3 illustrates the means for supporting an electric light bulb 22 within the globe 15. The bulb is held by a metallic holder 23 which may be a spring clip or a bayonet or threaded type, etc., of receptacle to hold the bulb by its base. The other contact of the bulb is engaged by a metallic contact 24. The holder 23 is attached to or integral with a metallic base element 25 which is attached to a similar element 26 upon which the contact 24 is mounted. The base elements 25 and 26 are electrically insulated from each other by a strip 27 of insulation material. To the outer ends of the base elements 25 and 26 are attached upwardly extending metallic rods 28 and 29 which terminate in horizontal pivot support members which are in axial alignment with their axes passing through the center of the light bulb. The horizontal pivot support members pass through holes or the like in the upper ends of a pair of spaced metallic support members 30 and 31. Member 30 is mounted on and electrically bonded to an inside enlarged base portion 32 of one of the pivots 19 about which the globe 15 rotates within the gimbal ring 18, the pivots 19 being fixedly attached to the gimbal ring. The other support member 31 is fixedly mounted on the same base portion 32 but is insulated therefrom as by insulation 33. One path of electrical energy to the bulb 22 is via the metallic gimbal ring 18 which is connected to the source in any suitable manner as by the pivot 20 of Fig. 3. From the ring 18 the path is through the lower pivot 19 of Fig. 3, the member 30, rod 28, element 25 and holder 23 to the metallic base of the bulb. The other path is through an insulated wire 34 which is connected to the source and is wound around the gimbal ring beginning at a point adjacent a pivot 20 to the pivot 19 at the bottom of Fig. 3, the pivot being hollow and the wire 34 passing through the bore thereof and being connected to the support member 31. From member 31 the path is through the rod 29, base element 26, and contact 24 to the other contact point on the base of the bulb 22.

Due to the fact that the center of gravity of the assembly upon which the lamp bulb is pivotally supported on the members 31 and 32 is below the axis of the horizontal portions of the rods 28 and 29, the assembly is pendulous and the bulb 22 will be always pointing vertically upwardly irrespective of the position to which the gimbal ring has been rotated about its axis defined by pivots 20.

The globe 15 is perforated over substantially its entire surface in a pattern which is a duplicate of the arrangement of the stars in the sky. The size of the holes vary according to the magnitude of the stars represented. If an observer could place his eye at the center of the globe, and the globe were illuminated evenly from the outside, the observer would see the stars in the same relative positions and sizes as if he were located at the same point as the center of the earth. However, with the disclosed apparatus the light bulb 22 shines through the perforations, shown as various sized black dots on the surface of the globe, and throws small spots of light on the inner surface of the canopy 1. Since the inner surface of the canopy is white, the spots of light are very clear and well defined when the room is dark. The walls of the box 16 obstruct the light passing through the perforations of the lower half of the globe. If desired, the walls of the box can be higher and the box circular, so that all of the light rays except those which are intended to strike the canopy are obscured.

In order to make the stars move, as in their natural manner when viewed from any point on the earth's surface, the globe is rotated within the gimbal ring about the axis of the pivots 19. In order to view the stars which would be visible from different lines of latitude the gimbal ring 18 is rotated about the axis of its pivots 20. The gimbal ring need be rotatable only through 180 degrees, so that the stars as would be seen from the North or South poles, and all latitudes between can be seen. As shown in Fig. 2, an index arm 35 is fixed to one of the gimbal ring pivots 20, its end traveling over an angularly graduated circular scale 36 to indicate the line of latitude at which the gimbal ring is positioned. In order to hold the gimbal ring fixed after it has been moved to the desired position, a screw 37 threaded through the index arm is turned until it engages the surface of the box 16.

As shown in Fig. 1, a spotlight 38 is held by the person seated, who may be the lecturer. The spotlight directs a small spot of light which the lecturer uses to point out the various stars and constellations. A colored lens is used for the spotlight to distinguish its spot from those emanating from the light bulb within the globe 15. As shown, the spotlight is connected by a wire 39 to the box 16 where it is in turn connected to the same source of electricity which provides energy for the light bulb 22, there being a wire 40 leading from the source to the box as shown. Since the source of electricity providing energy for the device will usually be 110 volts alternating current, and the bulb within the spotlight 38 and within the globe 15 are preferably of low voltage, so that there will be only a small amount of heating within the globe, a transformer, not shown, is provided within the box 16, to reduce the voltage of the electric current supplied by wire 40.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States for governmental purposes without the payment of any royalties thereon or therefor.

I claim:

1. A portable educational device for the study of the stars, comprising a hollow opaque spherical globe having perforations over substantially its entire surface, of such size and relative disposition as to represent the stars in the sky; means supporting said globe for rotation about a polar axis comprising a gimbal ring having a pair of diametrically opposed pivots, each of which supports said globe at one pole for rotation; means for supporting said gimbal ring for rotation about an axis intersecting said polar axis at right angles; a substantially point source of light at the center of the globe; a substantially spherically shaped canopy comprising a plate, a series of equiangularly spaced circularly curved ribs hingedly attached at one end to said plate, and a cover of fabric or the like attached to the underside of said ribs providing a continuous inner surface; and means for supporting said canopy over said globe so that their centers substantially coincide.

2. The device described in claim 1 wherein said source of light is carried by a pendulous supporting means mounted in said globe, constructed and arranged to seek a vertical attitude regardless of the position to which the gimbal ring has been rotated.

3. For use as an educational device for the study of the stars a substantially spherically shaped canopy comprising a plate; a series of equiangularly spaced circularly curved ribs hingedly attached at one end to said plate; and a cover of fabric or the like attached to the underside of said ribs providing a continuous inner surface.

4. The device described in claim 3 wherein said ribs are formed of two parts overlapping adjacent the mid-points of the ribs; means hinging said overlapping parts together; and means operable to lock said overlapping parts together.

5. The device described in claim 1 wherein said source of light is carried by a U-shaped pendulous supporting means mounted in said globe, constructed and arranged to seek a vertical attitude regardless of the position to which the gimbal ring has been rotated.

6. The device described in claim 1 wherein said source of light is carried by a pendulous supporting means of open-topped construction mounted in said globe, constructed and arranged to seek a vertical attitude regardless of the position to which the gimbal ring has been rotated.

7. The device described in claim 1 wherein said ribs are formed of two parts overlapping adjacent the mid-points of the ribs; means hinging said overlapping parts together; and means operable to lock said overlapping parts together.

EDWIN H. WENBERG.

REFERENCES CITED

The following references are of record in the file of this patent:

UNITED STATES PATENTS

| Number | Name | Date |
| --- | --- | --- |
| 336,280 | Bailey | Feb. 16, 1886 |
| 501,136 | Gregory | July 11, 1893 |
| 680,461 | Mitchell | Aug. 13, 1901 |
| 988,471 | Jones | Apr. 4, 1911 |
| 1,132,409 | Utsunomiya | Mar. 16, 1915 |
| 1,150,731 | Barcus | Aug. 17, 1915 |
| 2,382,643 | Lafferty | Aug. 14, 1945 |

FOREIGN PATENTS

| Number | Country | Date |
| --- | --- | --- |
| 342,886 | Great Britain | 1931 |
| 609,605 | France | 1926 |